Feb. 3, 1970 L. W. ERATH 3,493,682

AUDIO COMPONENT MATCHING SYSTEM

Filed Nov. 21, 1966

INVENTOR
LOUIS W. ERATH

BY Arnold & Roylance
ATTORNEYS

United States Patent Office 3,493,682
Patented Feb. 3, 1970

3,493,682

AUDIO COMPONENT MATCHING SYSTEM

Louis W. Erath, 7518 Inwood, Houston, Tex. 77042

Filed Nov. 21, 1966, Ser. No. 595,666
Int. Cl. H04r 3/04
U.S. Cl. 179—1 12 Claims

ABSTRACT OF THE DISCLOSURE

Audio reproduction apparatus having a compensated audio amplifier, a speaker with a separate network to compensate for speaker characteristics and conductors and connectors to put the speaker and amplifier together to form a fully compensated system. When separated, the parts are interchangeable and can be individually tested.

This invention relates to audio reproduction systems and, more specifically, to interconnection and interchanging of high fidelity audio amplifiers and speakers with their associated compensation networks.

In the manufacture of audio equipment of high quality, it is common to include in the amplifiers compensation circuits which render the response of the amplifier flat within predetermined limits of signal level. This arrangement allows a purchaser to connect such an amplifier to any high quality speaker and to obtain reasonably good performance. The performance obtained, however, will not necessarily be optimum because the response characteristics of one speaker are not necessarily the same as another, and because the enclosure into which the speaker is placed can change speaker characteristics.

This situation has led to the practice of producing a specially compensated amplifier to be used with a particular preselected speaker mounted in a preselected enclosure. In such a system, the total system output matches the response of the human auditory system with considerable precision and a truly high degree of fidelity is achieved.

However, the amplifier must then be used only with a particular speaker and enclosure assembly, or a speaker and enclosure assembly of the system constitute a "matched pair," the usefulness of either part being substantially diminished without the other. This is true because the amplifier, having been compensated for a particular speaker-enclosure unit, no longer exhibits a flat response, and its response curve does not necessarily match any other speaker-enclosure combination. Further, degeneration of the amplifier performance cannot be checked with any reasonable degree of assurance with normal test equipment because its response characteristic is not flat even when it is operating at its best.

It is therefore an object of the present invention to provide audio system apparatus the component parts of which are effectively interchangeable and can be individually tested and evaluated by conventional testing procedures.

Another object is to provide an apparatus for modifying the amplifier and speaker portions of an audio system to render the portions interchangeable with other amplifiers or speakers whether the latter are compensated or not.

Broadly described, the invention includes a compensation network designed to accompany a particular electroacoustic transducer, or speaker, the compensation network advantageously being incorporated physically in the enclosure within which the speaker is mounted; a compensated amplifier; a network for rendering a portion of the amplifier compensating network ineffective when the amplifier and speaker are connected together to form an operative audio system; and means for connecting the parts together. The compensating network of the amplifier assures that the amplifier has a relatively flat response standing alone. The speaker assembly network is designed to alter the characteristics of the amplifier compensating network only when the two are connected together, thus yielding an overall system in which the total response closely matches the human auditory system response.

In order that the manner in which the foregoing and other objects are attained in accordance with the invention can be understood in detail, particularly advantageous embodiments thereof will be described with reference to the accompanying drawings, which form a part of this specification and wherein.

Figure 1:
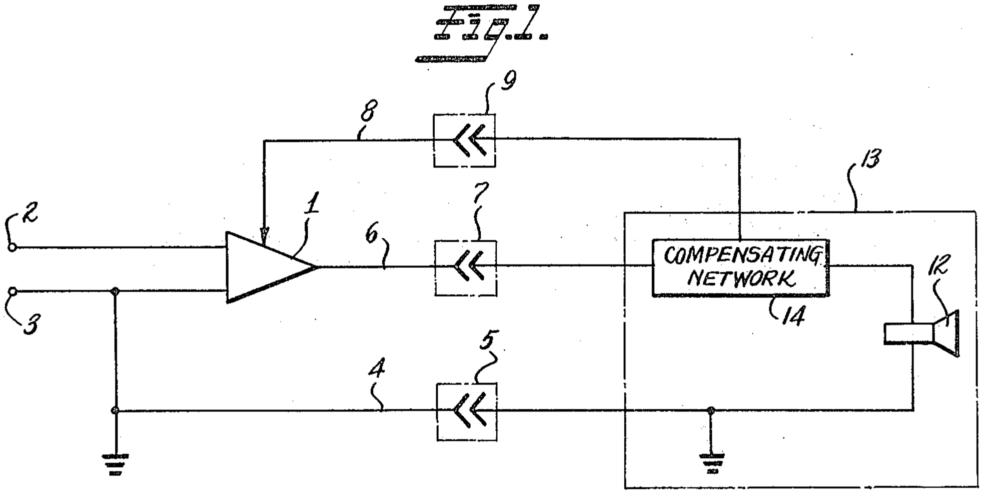
FIG. 1 is a schematic diagram, partly in block form, of an embodiment of the invention in its broader aspects.

Referring now to FIG. 1, it will be seen that the apparatus includes a conventional broad band, high quality, audio amplifier 1 comprising suitable compensating circuitry to provide relatively constant amplification over a wide band of frequencies, including substantially all frequencies within the range of human hearing. A pair of input terminals 2 and 3 are connected to the amplifier input terminals, terminals 2 and 3 being externally connected to any source of audio signals such as, for example, a conventional phonograph transducer cartridge, a magnetic tape transducer, or a radio tuner. Terminal 3 is connected to the ground terminal of the amplifier input. A conductor 4 is connected to one part of a conventional separatable electrical connector 5 which can be of any of the well known types of connectors used in audio systems. The output terminal of amplifier 1 is connected via a conductor 6 to one side of a similar connector 7. A conductor 8 interconnects one side of another such connector 9 and an appropriate point in the compensating circuitry of amplifier 1.

The mating portion of connector 5 is connected to the ground side of the drive coil of an electroacoustic transducer, or loud speaker, 12 which is housed in a cabinet or speaker enclosure 13. The mating portion of connector 7 is connected to one terminal of a compensating network 14, another terminal of which is connected to the other terminal of the drive coil of speaker 12.

Network 14 is of a type which produces an electrical signal which is a function of the frequency and amplitude of the electrical signal supplied by amplifier 1 to the loud speaker. This electrical signal appears at an output terminal of network 14 and is connected to the mating portion of connector 9. Compensating network 14 can be of the type disclosed in my copending application Ser. No. 487,461; filed Sept. 15, 1965 now Patent No. 3,449,518. As will be recognized by those skilled in the art, the signal produced by the compensating network 14 is necessarily developed to compensate for the characteristics of a particular transducer, this compensation being adjusted by the selection of various circuit values in the network itself.

It will be recognized that amplifier 1 and loud speaker 12 are conventional pieces of equipment in audio systems, and that the existence of a compensating network like network 14 in an audio system is not expressly novel. However, it will further be recognized that in accordance with this invention modifications can be made so that the components of the system are rendered interchangeable and the components can then be individually tested in a manner not heretofore possible. By including compensating network 14 with loud speaker 12 in its enclosure and by providing a connection for conductor 8 in the compensating network of amplifier 1, the amplifier alone, when disconnected by separating connectors 5, 7 and 9, can be operated and tested as a conventional "flat response" amplifier and will exhibit no unusual characteristics. Yet, when connected to the speaker and compensating network shown in FIG. 1, the output signal from the compensating network operates to alter the amplifier characteristics and render it suitable for use with this particular speaker in a manner not heretofore possible. Also, it will be recognized that the speaker assembly can likewise be used alone or with a conventional amplifier not having provision for connection of conductor 8 to the compensating network. In this case, the amplifier and speaker will operate as though the compensating network and its feedback signal via connector 9 and conductor 8 were not present.

Figure 2:
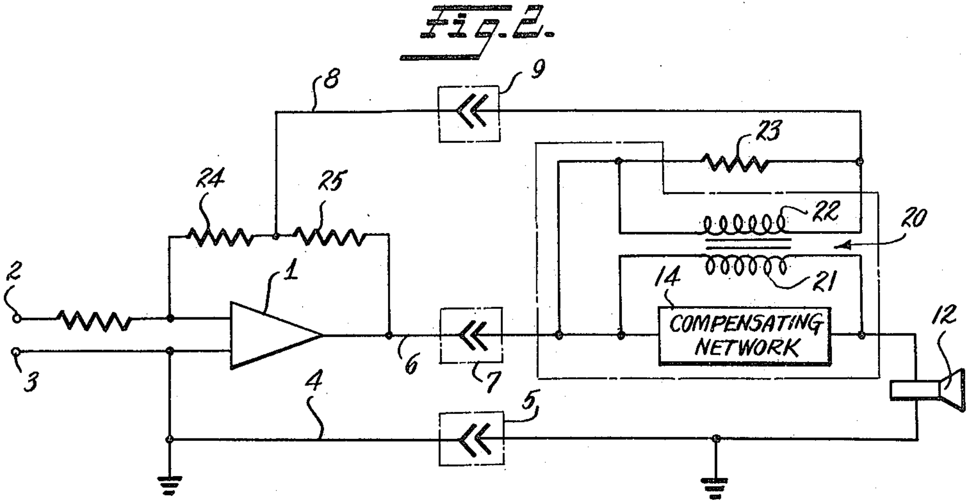
FIG. 2 is a schematic diagram, partly in block form, of a second embodiment of the invention.

FIG. 2 shows an audio system in which the amplifier has a particular type of feedback and the speaker compensating network utilizes a transformer-coupled output. In FIG. 2, those elements of the system which are analogous to those of FIG. 1 are identified by like reference numerals. These include the amplifier 1, input terminals 2 and 3, conductors 4, 6, and 8, connectors 5, 7, and 9, speaker 12 and compensating network 14. It will be seen that the compensating network includes a transformer, indicated generally at 20, having a primary winding 21 which is connected between the terminals of the compensation network in series circuit relationship with the speaker 12. Transformer 20 also has a secondary winding 22 one terminal of which is connected to the amplifier side of the compensating network 14 and the other terminal of which is connected through connector 9 and conductor 8 to the amplifier feedback circuit. A resistor 23 is connected in parallel circuit relationship with secondary winding 22.

The amplifier feedback circuit includes a resistor 24 and a resistor 25 connected in series circuit relationship between the input and output terminals of the amplifier. Conductor 8 is connected to the junction between these resistors.

In a typical system, the value of resistor 25 is on the order of ten times larger than that of resistor 24. Resistor 23, however, is substantially smaller than either of resistors 24 and 25 so that, when connector 9 is assembled, the low resistance of resistor 23 removes the effect of resistor 25 from the circuit and allows the signal from the transformer 20 as developed by the compensating network to have a much greater effect on the amplifier characteristics than does the feedback circuit including resistors 24 and 25.

From the circuit arrangement of FIG. 2 it will be clearly seen that, when connector 9 is separated so that the signal from transformer 20 has no effect, amplifier 1 and its feedback circuit will operate as a conventional flat response amplifier and will drive the loud speaker in the conventional manner. It will also be seen that amplifier 1 can be subjected to any normal test procedure and that these tests will reveal its operating condition based on the known characteristics of a flat amplifier. Further, if the amplifier is connected by connectors 5 and 7 to a speaker which has no compensating network and no connection equivalent to connector 9, the speaker will be driven in the usual manner expected of a flat response amplifier driving an uncompensated speaker. Further, the speaker alone can be tested and evaluated on the basis of the speaker characteristics without a compensating signal feedback signal.

Figure 3:
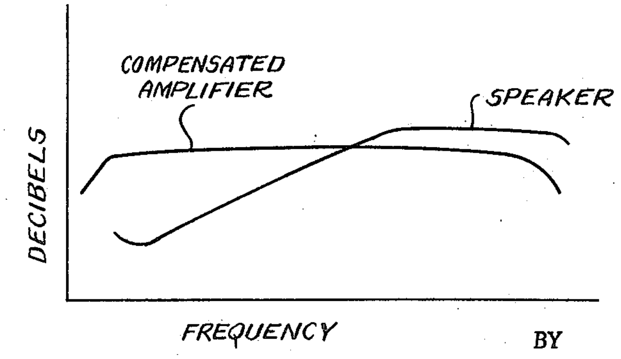
FIG. 3 is a graph of the frequency response of a typical broad-band amplifier and loudspeaker.

FIG. 3 illustrates a typical amplifier characteristic which is substantially flat throughout the audible frequency range, and also a curve representing a typical speaker response over this frequency range. It will be noted that the speaker response is not necessarily flat, and that this curve demonstrates the need for the additional compensating network such as network 14 to provide optimum operation. Various speakers will provide characteristic curves of various shapes, not necessarily similar to that shown in FIG. 3, which is presented only by way of example.

While certain advantageous embodiments have been chosen to illustrate the invention, it will be understood by those skilled in the art that various changes and modifications can be made therein without departing from the scope of the invention as defined in the appended claims.

What is claimed is:

1. An audio amplifier system for use with an electroacoustic transducer having a compensation network, comprising:

a pair of input terminals for connection to an audio source;

a pair of output connectors for connection to said transducer;

an amplifier connected in circuit between said input terminals and said output connectors;

a first feedback loop connected in said amplifier and adapted to cause said amplifier to have a substantially flat frequency response in the audio range;

a control connector connected to a juncture in said first feedback loop such that said amplifier system may assume a desired frequency response to match said transducer when a feedback signal of said compensation network is connected to said control connector to form a second feedback loop.

2. An audio amplifier system as defined in claim 1 further comprising:

means for rendering ineffective said first feedback loop when said control connector is connected to said compensation network of said transducer to form said second feedback loop.

3. An audio amplifier system as defined in claim 1 wherein said first feedback loop comprises a first and second resistor connected in series circuit with each other, said second resistor being connected in circuit nearer said output terminals than said first resistor, said control connecting being connected in circuit to the juncture between said first and second resistors.

4. An audio amplifier system as defined in claim 3 wherein said second resistor has a resistance which is large compared to the resistance of said first resistor.

5. A loudspeaker system for use with an audio amplifier system having a first feedback loop, comprising:

a pair of input connectors for connection to the audio amplifier system;

an electroacoustic transducer connected in circuit to said input connectors;

a control output connector for connection to a juncture in said first feedback loop;

a compensation network connected in circuit between a first of said input connectors and said control output connector, said compensation network being adapted to modify the frequency response of said amplifier to provide a desired output response for said loudspeaker system when said control output connector is connected to said first feedback loop in said audio amplifier system to form a second feedback loop.

6. A loudspeaker system as defined in claim 5 wherein said compensation network is connected between said first input connector and said transducer, and wherein said loudspeaker system further comprises a transformer having a first and second winding, said first winding being connected in shunt across said compensation network, said second winding being connected in shunt between said first input connector and said control output connector.

7. An audio reproduction system, comprising:

an amplifier having a pair of input terminals for connection to an audio source and a pair of output terminals;

a first feedback loop connected between a first of said input terminals and a first of said output terminals of said amplifier, said first feedback loop being adapted to cause said amplifier to have a substantially flat frequency response in the audio range;

an amplifier control connector connected to a juncture in said first feedback loop;

a pair of amplifier output connectors respectively connected to said output terminals;

a pair of loudspeaker input connectors detachably connected respectively to said amplifier output connectors;

an electroacoustic transducer connected in circuit with said loudspeaker input connectors;

a loudspeaker control connector detachably connected to said amplifier control connector;

a compensation network connected in circuit between a first of said loudspeaker input connectors and said loudspeaker control connector, to form a second feedback loop, said compensation network being adapted to develop a feedback signal which when applied to said second feedback loop will be operative to change the frequency response characteristics of said amplifier to vary from the flat response in the absence of said feedback signal to one which provides a desired output response for said transducer.

8. An audio system as defined in claim 7 further comprising:

means for rendering ineffective said first feedback loop when said control connector is connected to said compensation network to form said second feedback loop.

9. An audio system as defined in claim 7 wherein said first feedback loop comprises a first and second resistor connected in series circuit relationship with each other, said second resistor being connected in circuit nearer said output terminals than said first resistor, said control connector being connected in circuit to the juncture between said first and second resistors.

10. An audio system as defined in claim 9 wherein said second resistor has a resistance which is large compared to the resistance of said first resistor.

11. An audio system a defined in claim 10 further comprising a third resistor connected in shunt between said loudspeaker control connector and said first of said loudspeaker input connectors, said third resistor having a resistance which is small compared to the resistance of said second resistor such that the effect of said second feedback loop dominates the effect of said first feedback loop when said connectors are joined.

12. An audio system as defined in claim 7 further comprising a transformer having a first and second winding, said first winding being connected in shunt across said compensation network, said second winding being connected in shunt between said first loudspeaker input connector and said loudspeaker control connector.

References Cited

UNITED STATES PATENTS

| | | |
|---|---|---|
| 2,396,691 | 3/1946 | Galbreath. |
| 3,066,188 | 11/1962 | Slaats et al. |
| 3,175,046 | 3/1965 | Chapman. |
| 3,249,695 | 3/1966 | Loughlin et al. -- 325—404 XR |
| 3,399,277 | 8/1968 | Davis et al. |

WILLIAM C. COOPER, Primary Examiner

CHARLES W. JIRAUCH, Assistant Examiner